United States Patent
Jung et al.

(10) Patent No.: US 10,349,389 B2
(45) Date of Patent: Jul. 9, 2019

(54) METHOD FOR DEVICE-TO-DEVICE (D2D) OPERATION PERFORMED BY TERMINAL IN WIRELESS COMMUNICATION SYSTEM AND TERMINAL USING THE METHOD

(71) Applicant: LG ELECTRONICS INC., Seoul (KR)

(72) Inventors: Sunghoon Jung, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 58 days.

(21) Appl. No.: 15/125,556

(22) PCT Filed: Mar. 20, 2015

(86) PCT No.: PCT/KR2015/002771
§ 371 (c)(1),
(2) Date: Sep. 12, 2016

(87) PCT Pub. No.: WO2015/142123
PCT Pub. Date: Sep. 24, 2015

(65) Prior Publication Data
US 2017/0006585 A1    Jan. 5, 2017

Related U.S. Application Data

(60) Provisional application No. 61/968,341, filed on Mar. 20, 2014.

(51) Int. Cl.
*H04W 72/04* (2009.01)
*H04W 48/12* (2009.01)
(Continued)

(52) U.S. Cl.
CPC ......... *H04W 72/042* (2013.01); *H04W 48/12* (2013.01); *H04W 8/005* (2013.01); *H04W 92/18* (2013.01)

(58) Field of Classification Search
CPC ... H04W 72/042; H04W 48/12; H04W 8/005; H04W 92/18
See application file for complete search history.

(56) References Cited

U.S. PATENT DOCUMENTS

2013/0109301 A1* 5/2013 Hakola ............... H04W 76/023
455/39
2014/0328329 A1* 11/2014 Novlan ............... H04W 72/042
370/336

(Continued)

FOREIGN PATENT DOCUMENTS

GB        2497604        6/2013
WO    2012150815 A2    11/2012
(Continued)

OTHER PUBLICATIONS

Ericsson, "Frame Structure for D2D-Enabled LTE Carriers", 3GPP TSG RAN WG1 Meeting #76, R1-140775, Jan. 31, 2014, 3 Pages.

(Continued)

*Primary Examiner* — Curtis A Alia
(74) *Attorney, Agent, or Firm* — Lee Hong Degerman Kang Waimey

(57) ABSTRACT

A method for device-to-device (D2D) operation performed by a terminal in a wireless communication system, and a terminal using the method are provided. The method comprises: receiving system information including reception resource pool information; and receiving a D2D signal by using resources indicated by the reception resource pool information, wherein the reception resource pool information indicates resources for which receiving the D2D signal is allowed during a radio resource control (RRC) idle state and an RRC connected state.

6 Claims, 17 Drawing Sheets

(51) Int. Cl.
 *H04W 92/18* (2009.01)
 *H04W 8/00* (2009.01)

(56) References Cited

U.S. PATENT DOCUMENTS

| 2014/0376458 | A1* | 12/2014 | Ryu | H04W 72/085 370/329 |
|---|---|---|---|---|
| 2017/0006585 | A1* | 1/2017 | Jung | H04W 72/042 |
| 2017/0006621 | A1* | 1/2017 | Jung | H04W 8/005 |
| 2017/0048647 | A1* | 2/2017 | Jung | H04W 72/04 |
| 2017/0195905 | A1* | 7/2017 | Jung | H04W 24/08 |
| 2017/0223708 | A1* | 8/2017 | Jung | H04W 72/0446 |

FOREIGN PATENT DOCUMENTS

| WO | 2012159270 A1 | 11/2012 |
|---|---|---|
| WO | 2013077684 A1 | 5/2013 |

OTHER PUBLICATIONS

Japan Patent Office Application No. 2017-500786, Office Action dated Sep. 12, 2017, 2 pages.
European Patent Office Application Serial No. 15764529.2, Search Report dated Oct. 12, 2017, 11 pages.
Qualcomm, "TP for TR 36.843 capturing agreements from RAN2 #85", 3GPP TSG RAN WG2 Meeting #85, R2-141008, Feb. 2014, 7 pages.
Qualcomm, et al., "Direct discovery EPC impacts", 3GPP TSG SA WG2 Meeting #101bis, S2-140804 (was S2-140599), Feb. 2014, 9 pages.
ZTE, "Resource allocation for D2D communication", 3GPP TSG RAN WG2 Meeting #85, R2-140693, Feb. 2014, 5 pages.
Catt, "Resource Pool for D2D Communication", 3GPP TSG RAN WG2 Meeting #85, R2-140070, Feb. 2014, 3 pages.
Qualcomm, "TP for TR 36.843 capturing agreements from RAN2 #85", 3GPP TSG RAN WG2 Meeting #85, R2-140966, Feb. 2014, 7 pages.
Catt, "CSMA or Coordinated Access based Resource Allocation for D2D Communication", 3GPP TSG RAN WG2 Meeting #84, R2-134061, Nov. 2013, 7 pages.
Korean Intellectual Property Office Application No. 10-2016-7024839, Office Action dated Mar. 26, 2018, 5 pages.
Intel, "Resource allocation for D2D communication", 3GPP TSG RAN WG2 Meeting #85, R2-140312, Feb. 2014, 5 pages.
3rd Generation Partnership Project (3GPP), "Technical Specification Group Radio Access Network; Study on LTE Device to Device Proximity Services; Radio Aspects (Release 12)," 3GPP TR 36.843 V1.2.0, Feb. 2014, 49 pages.
State Intellectual Property Office of the People's Republic of China Application Serial No. 201580015058.6, Office Action dated Dec. 24, 2018, 8 pages.

* cited by examiner

METHOD FOR DEVICE-TO-DEVICE (D2D) OPERATION PERFORMED BY TERMINAL IN WIRELESS COMMUNICATION SYSTEM AND TERMINAL USING THE METHOD

CROSS-REFERENCE TO RELATED APPLICATIONS

This application is the National Stage filing under 35 U.S.C. 371 of International Application No. PCT/KR2015/002771, filed on Mar. 20, 2015, which claims the benefit of U.S. Provisional Application No. 61/968,341, filed on Mar. 20, 2014, the contents of which are all hereby incorporated by reference herein in their entirety.

BACKGROUND OF THE INVENTION

Field of the Invention

The present invention relates to wireless communications, and more particularly, to a method for a device-to-device (D2D) operation performed by a terminal in a wireless communication system, and the terminal using the method.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, $3^{rd}$ Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D22) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D operation.

D2D operation may have various advantages in that it is communication between devices in proximity. For example, D2D UE has a high transfer rate and a low delay and may perform data communication. Furthermore, in D2D operation, traffic concentrated on a base station can be distributed. If D2D UE plays the role of a relay, it may also play the role of extending coverage of a base station.

Meanwhile, a network may broadcast the information related to the D2D operation in a specific cell, which notifies the resources that are able to receive D2D signals. It is required to regulate how to operate when a terminal receives the information.

SUMMARY OF THE INVENTION

The present invention provides a method for a device-to-device (D2D) operation performed by a terminal in a wireless communication system, and the terminal using the method.

In one aspect, provided is a method for a device-to-device (D2D) operation performed by a user equipment (UE) in a wireless communication system. The method includes receiving system information including reception resource pool information; and receiving a D2D signal using resources indicated by the reception resource pool information. The reception resource pool information indicates resources in which reception of the D2D signal is allowed in a radio resource control (RRC) idle state and an RRC connected state.

The system information may be broadcasted.

The D2D signal may be a signal for a D2D communication or a signal for a D2D discovery.

The UE may receive the system information including the reception resource pool information in the RRC idle state.

The UE may receive the D2D signal using the resources indicated by the reception resource pool information, even in the case that the UE is switched from the RRC idle state to the RRC connected state.

The resources indicated by the reception resource pool information may be used for another UE to receive a D2D signal transmitted in mode 1 or a D2D signal transmitted in mode 2.

Mode 1 may be a mode that a network is scheduling a resource for a D2D signal transmission of another UE, and mode 2 may be a mode that another UE selects a specific resource for a D2D signal transmission within a resource pool.

In another aspect, provided is a user equipment (UE) for performing a device-to-device (D2D) operation in a wireless communication system. The UE includes a radio frequency (RF) unit configured to transmit or receive a radio signal and a processor operatively connected to the RF unit. The processor is configured to perform receiving system information including reception resource pool information and receiving a D2D signal using resources indicated by the reception resource pool information. The reception resource pool information indicates resources in which reception of the D2D signal is allowed in a radio resource control (RRC) idle state and an RRC connected state.

According to the present invention, a terminal may receive the D2D reception resource pool information broadcasted by a network. The terminal may receive D2D signals using the resource indicated by the D2D reception resource pool information in both of the RRC idle state and the RRC connected state. The method based on the present invention has an advantage in the aspect of signaling and reliability in comparison with the method for determining the D2D reception resource for each terminal.

DESCRIPTION OF EXEMPLARY EMBODIMENTS

Figure 1:
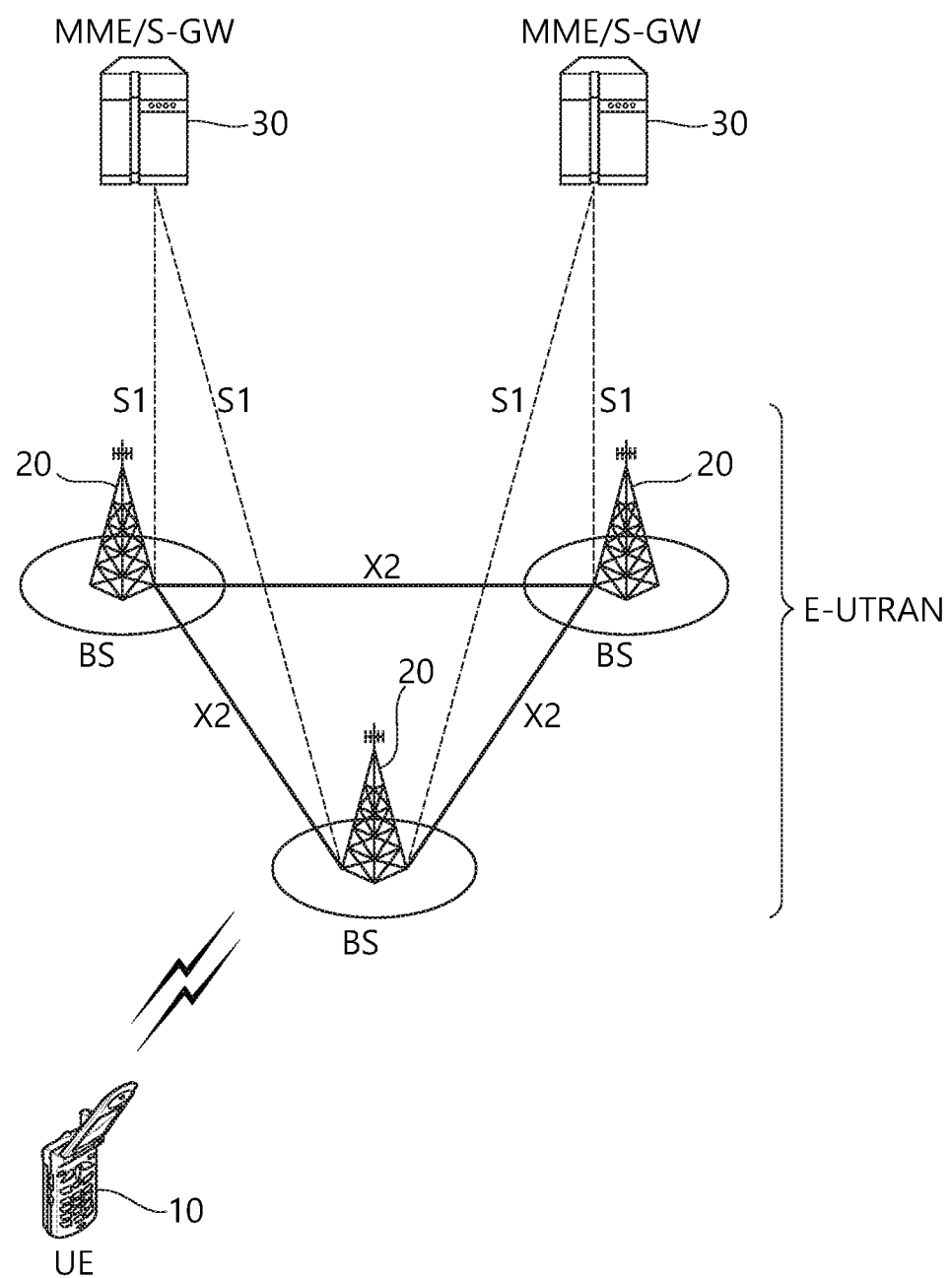
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
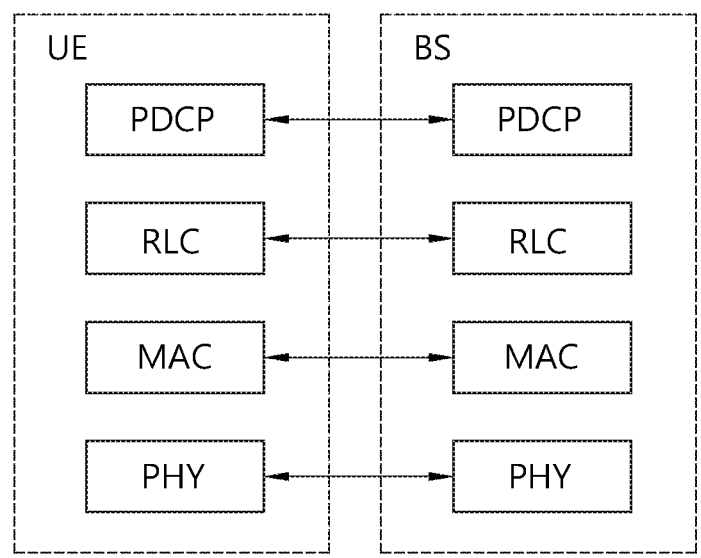
FIG. 2 is a diagram showing a wireless protocol architecture for a user plane.
Figure 3:
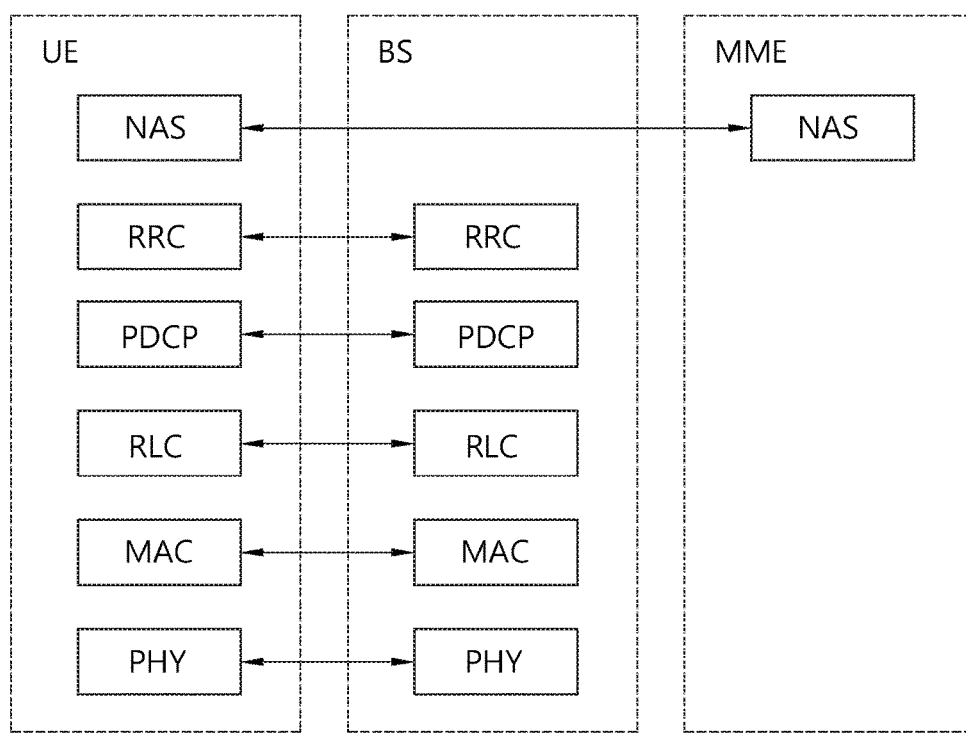
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include the limited number of parameters which are the most essential and are most frequently transmitted in order to obtain other information from a cell. UE first discovers an MIB after downlink synchronization. The MIB may include information, such as a downlink channel bandwidth, a PHICH configuration, an SFN supporting synchronization and operating as a timing reference, and an eNB transmission antenna configuration. The MIB may be broadcasted on a BCH.

SystemInformationBlockType1 (SIB1) of included SIBs is included in a "SystemInformationBlockType1" message and transmitted. Other SIBs other than the SIB1 are included in a system information message and transmitted. The mapping of the SIBs to the system information message may be flexibly configured by a scheduling information list parameter included in the SIB1. In this case, each SIB is included in a single system information message. Only SIBs having the same scheduling required value (e.g. period) may be mapped to the same system information message. Furthermore, SystemInformationBlockType2 (SIB2) is always mapped to a system information message corresponding to the first entry within the system information message list of a scheduling information list. A plurality of system information messages may be transmitted within the same period. The SIB1 and all of the system information messages are transmitted on a DL-SCH.

In addition to broadcast transmission, in the E-UTRAN, the SIB1 may be channel-dedicated signaling including a parameter set to have the same value as an existing set value. In this case, the SIB1 may be included in an RRC connection re-establishment message and transmitted.

The SIB1 includes information related to UE cell access and defines the scheduling of other SIBs. The SIB1 may include information related to the PLMN identifiers, Tracking Area Code (TAC), and cell ID of a network, a cell barring state indicative of whether a cell is a cell on which UE can camp, a required minimum reception level within a cell which is used as a cell reselection reference, and the transmission time and period of other SIBs.

The SIB2 may include radio resource configuration information common to all types of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and for detecting a change of system information to only a PCell. In an SCell, when the corresponding SCell is added, the E-UTRAN may provide all types of system information related to an RRC connection state operation through dedicated signaling. When system information related to a configured SCell is changed, the E-UTRAN may release a considered SCell and add the considered SCell later. This may be performed along with a single RRC connection re-establishment message. The E-UTRAN may set a value broadcast within a considered SCell and other parameter value through dedicated signaling.

UE needs to guarantee the validity of a specific type of system information. Such system information is called required system information. The required system information may be defined as follows.

If UE is in the RRC_IDLE state: the UE needs to have the valid version of the MIB and the SIB1 in addition to the SIB2 to SIB8. This may comply with the support of a considered RAT.

If UE is in the RRC connection state: the UE needs to have the valid version of the MIB, SIB1, and SIB2.

In general, the validity of system information may be guaranteed up to a maximum of 3 hours after being obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
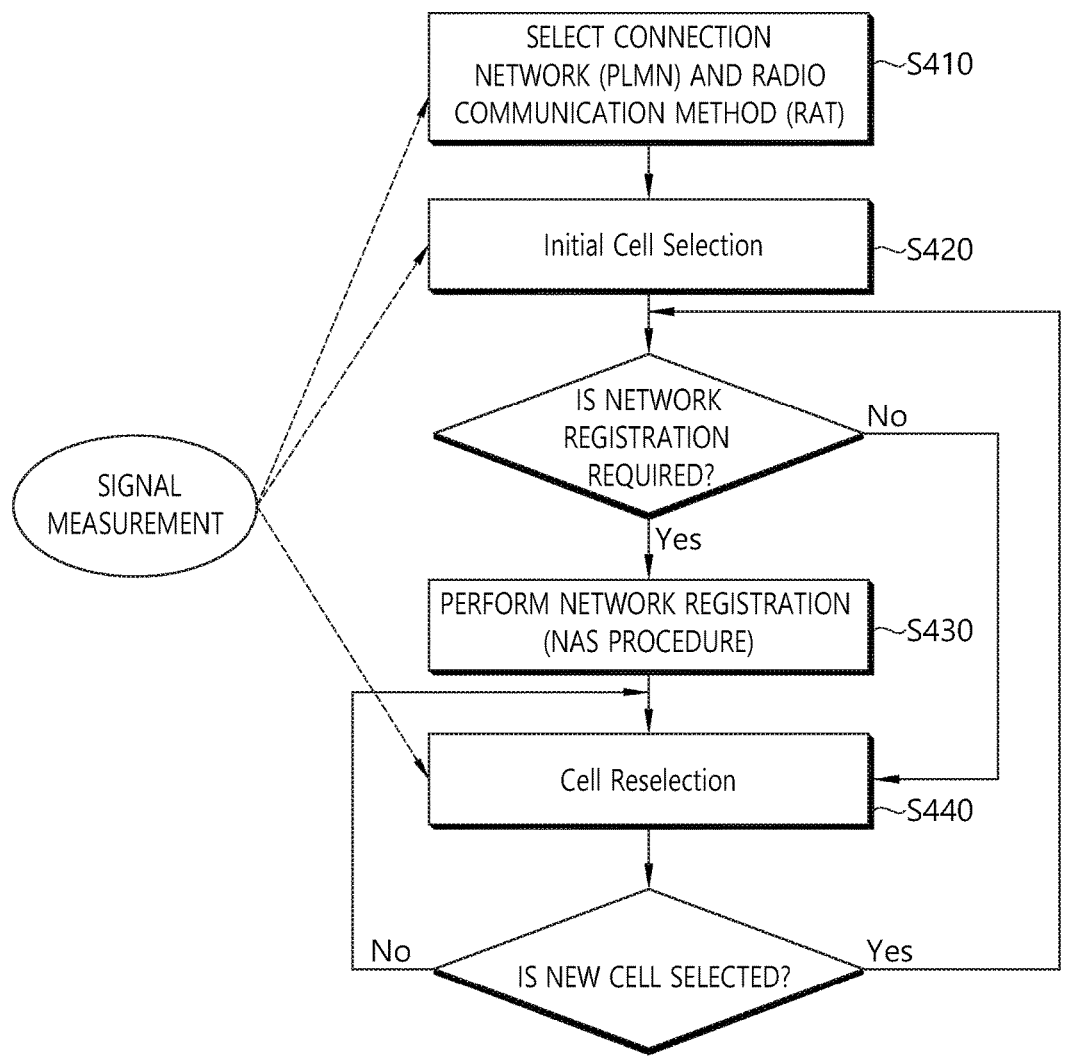
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
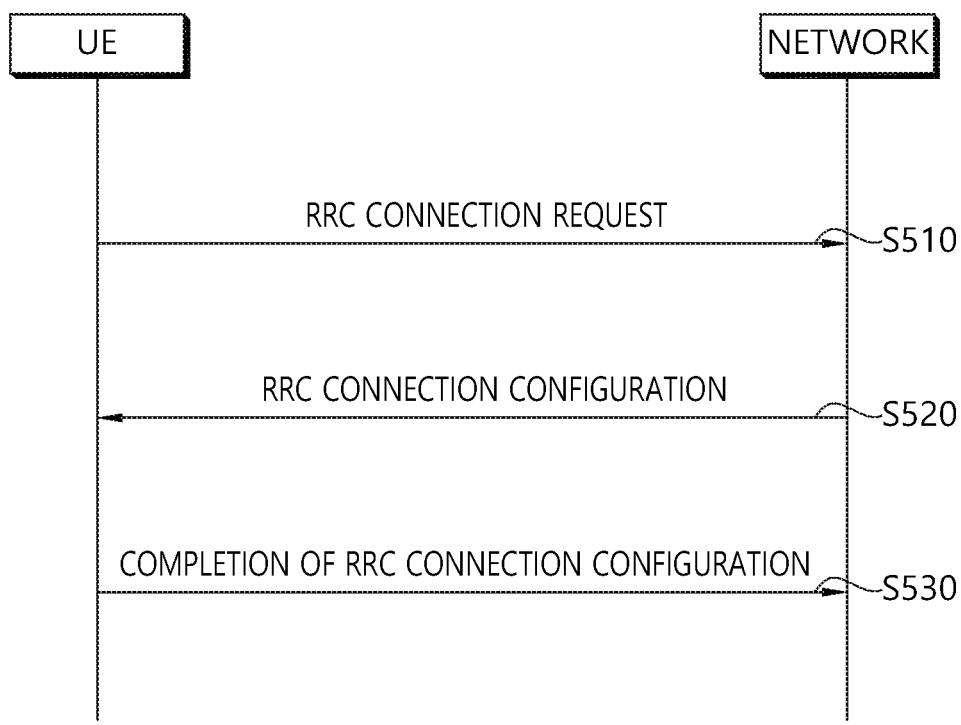
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
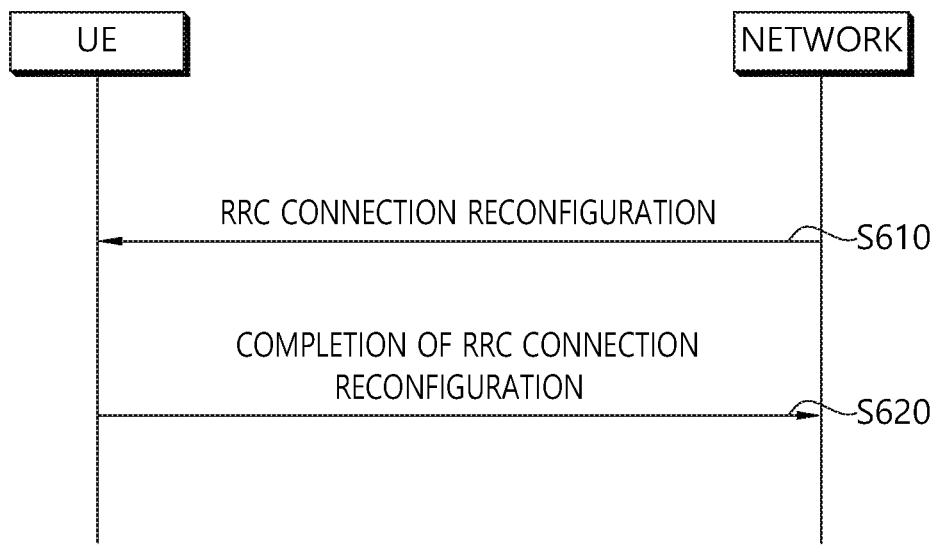
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

The cell selection criterion may be defined as below equation 1.

$$Srxlev > 0 \text{ AND } Squal > 0 \quad \text{[Equation 1]}$$

where:

$$Srxlev = Q_{rxlevmeas} - (Q_{rxlevmin} + Q_{rxlevminoffset}) - Pcompensation$$

$$Squal = Q_{qualmeas} - (Q_{qualmin} + Q_{qualminoffset})$$

Here, the variables in the equation 1 may be defined as below table 1.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |

TABLE 1-continued

| | |
|---|---|
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Signalled values, i.e., $Q_{rxlevminoffset}$ and $Q_{qualminoffset}$, may be applied to a case where cell selection is evaluated as a result of periodic search for a higher priority PLMN during a UE camps on a normal cell in a VPLMN. During the periodic search for the higher priority PLMN as described above, the UE may perform the cell selection evaluation by using parameter values stored in other cells of the higher priority PLMN.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.
Inter-frequency cell reselection: UE reselects a cell having a different center frequency from that of RAT, such as a cell on which the UE camps on
Inter-RAT cell reselection: UE reselects a cell that uses RAT different from RAT on which the UE camps The principle of a cell reselection process is as follows.
First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$Rs = Q\text{meas},s + Q\text{hyst}, \quad Rn = Q\text{meas},s - Q\text{offset} \quad \text{[Equation 2]}$$

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

- A case where UE determines that there is a serious problem in the quality of a downlink communication link (a case where the quality of a PCell is determined to be low while performing RLM) based on the radio quality measured results of the PHY layer of the UE
- A case where uplink transmission is problematic because a random access procedure continues to fail in the MAC sublayer.
- A case where uplink transmission is problematic because uplink data transmission continues to fail in the RLC sublayer.
- A case where handover is determined to have failed.
- A case where a message received by UE does not pass through an integrity check.

An RRC connection re-establishment procedure is described in more detail below.

Figure 7:
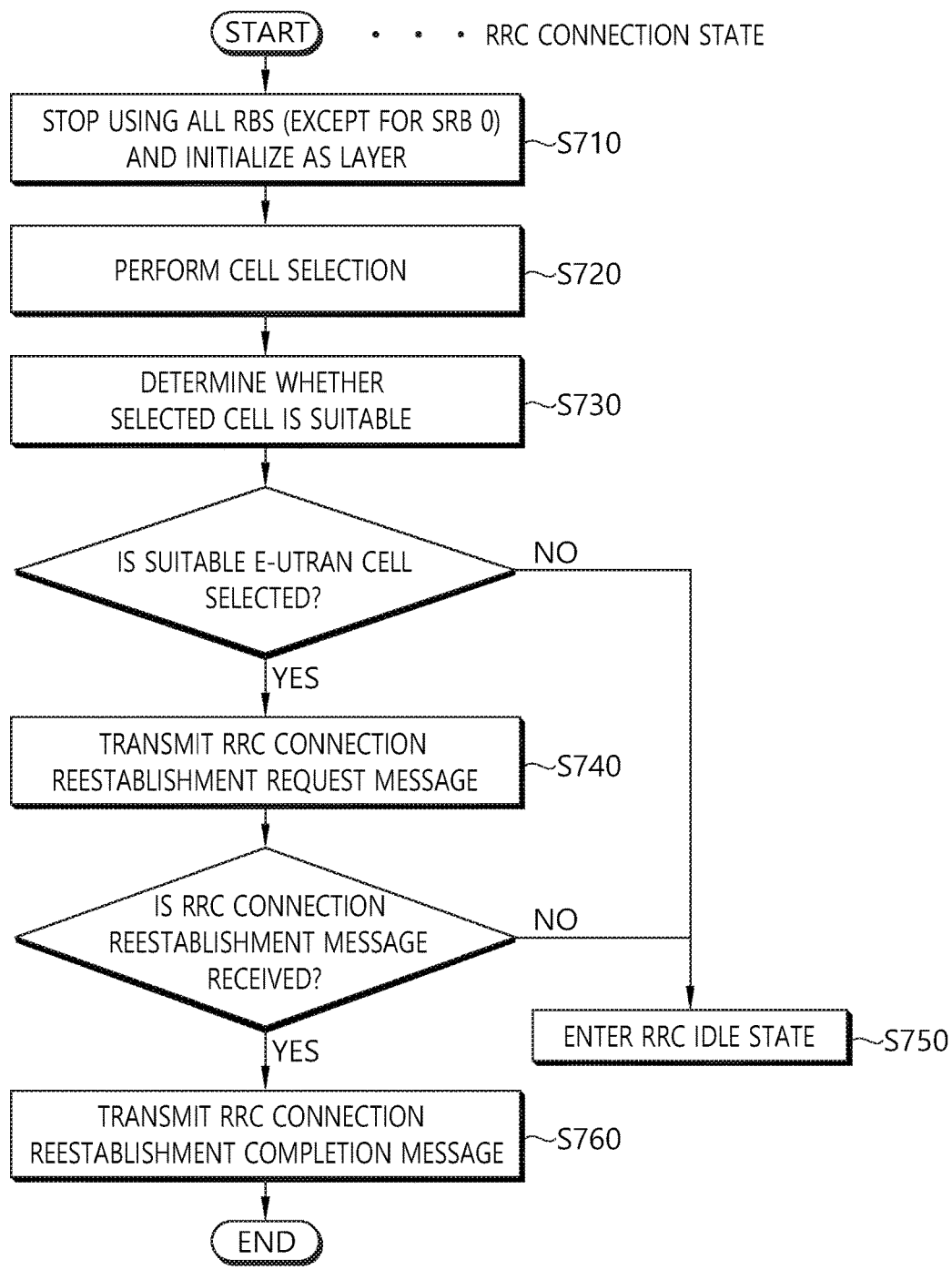
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
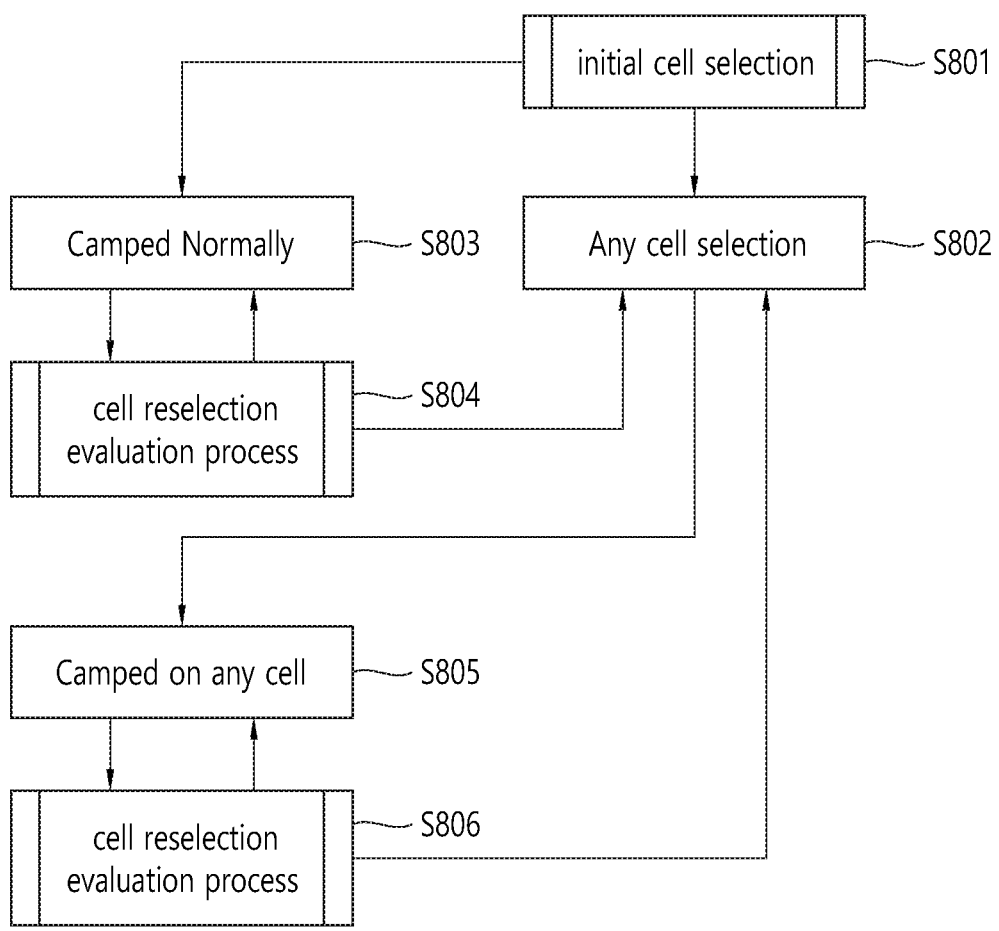
FIG. 8 illustrates substates which may be owned by UE in the RRC_IDLE state and a substate transition process.

FIG. 8 illustrates substates which may be owned by UE in the RRC_IDLE state and a substate transition process.

Referring to FIG. 8, UE performs an initial cell selection process (S801). The initial cell selection process may be performed when there is no cell information stored with respect to a PLMN or if a suitable cell is not discovered.

If a suitable cell is unable to be discovered in the initial cell selection process, the UE transits to any cell selection state (S802). The any cell selection state is the state in which the UE has not camped on a suitable cell and an acceptable cell and is the state in which the UE attempts to discover an acceptable cell of a specific PLMN on which the UE may camp. If the UE has not discovered any cell on which it may camp, the UE continues to stay in the any cell selection state until it discovers an acceptable cell.

If a suitable cell is discovered in the initial cell selection process, the UE transits to a normal camp state (S803). The normal camp state refers to the state in which the UE has camped on the suitable cell. In this state, the UE may select and monitor a paging channel based on information provided through system information and may perform an evaluation process for cell reselection.

If a cell reselection evaluation process (S804) is caused in the normal camp state (S803), the UE performs a cell reselection evaluation process (S804). If a suitable cell is discovered in the cell reselection evaluation process (S804), the UE transits to the normal camp state (S803) again.

If an acceptable cell is discovered in the any cell selection state (S802), the UE transmits to any cell camp state (S805). The any cell camp state is the state in which the UE has camped on the acceptable cell.

In the any cell camp state (S805), the UE may select and monitor a paging channel based on information provided through system information and may perform the evaluation process (S806) for cell reselection. If an acceptable cell is not discovered in the evaluation process (S806) for cell reselection, the UE transits to the any cell selection state (S802).

Now, a device-to-device (D2D) operation is described. In 3GPP LTE-A, a service related to the D2D operation is called a proximity service (ProSe). Now, the ProSe is described. Hereinafter, the ProSe is the same concept as the D2D operation, and the ProSe and the D2D operation may be used without distinction.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 9:
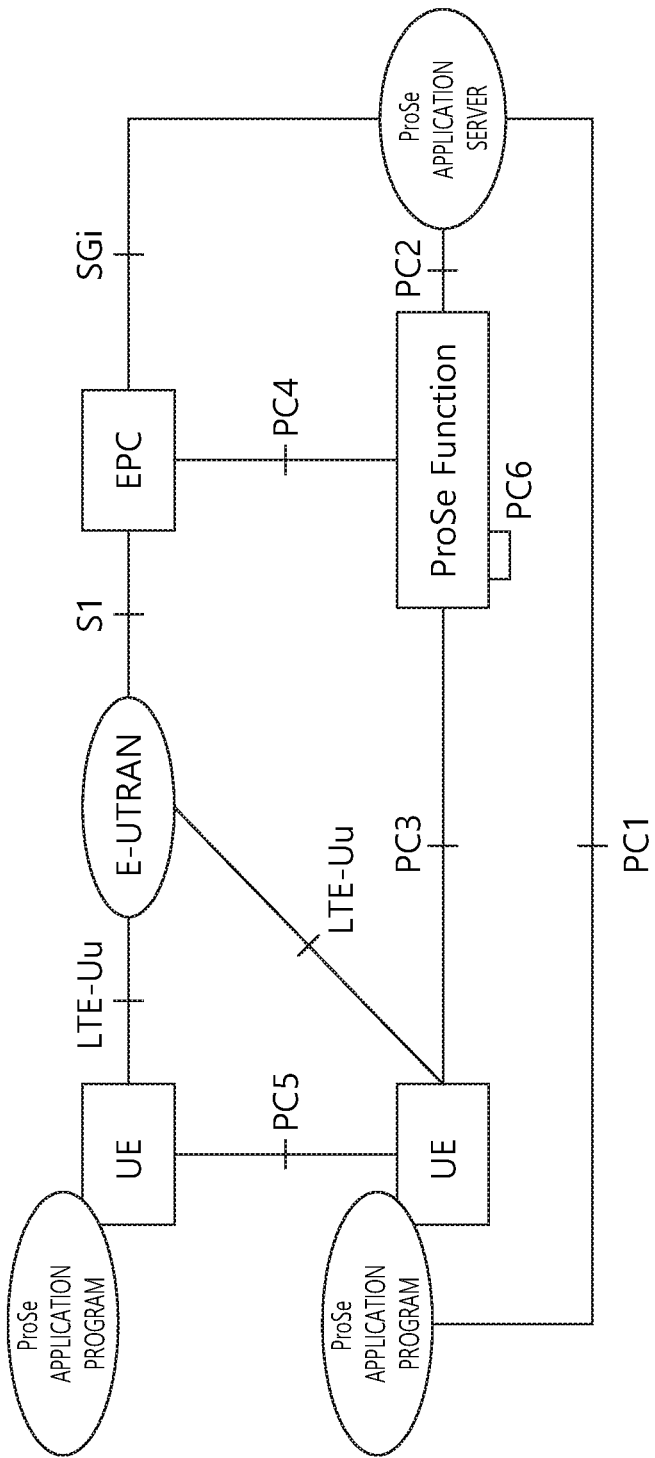
FIG. 9 shows a basic structure for ProSe.

FIG. 9 shows a basic structure for ProSe.

Referring to FIG. 9, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.

Interworking via a reference point toward the 3rd party applications
Authorization and configuration of UE for discovery and direct communication
Enable the functionality of EPC level ProSe discovery
ProSe related new subscriber data and handling of data storage, and also handling of the ProSe identities
Security related functionality
Provide control towards the EPC for policy related functionality
Provide functionality for charging (via or outside of the EPC, e.g., offline charging)

A reference point and a reference interface in the basic structure for ProSe are described below.

PC1: a reference point between the ProSe application program within the UE and the ProSe application program within the ProSe APP server. This is used to define signaling requirements in an application dimension.

PC2: a reference point between the ProSe APP server and the ProSe function. This is used to define an interaction between the ProSe APP server and the ProSe function. The update of application data in the ProSe database of the ProSe function may be an example of the interaction.

PC3: a reference point between the UE and the ProSe function. This is used to define an interaction between the UE and the ProSe function. A configuration for ProSe discovery and communication may be an example of the interaction.

PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.

PC5: a reference point used for using control/user plane for discovery and communication, relay, and 1:1 communication between types of UE.

PC6: a reference point for using a function, such as ProSe discovery, between users belonging to different PLMNs.

SGi: this may be used to exchange application data and types of application dimension control information.

<ProSe Direct Communication>

ProSe direct communication is communication mode in which two types of public safety UE can perform direct communication through a PC 5 interface. Such communication mode may be supported when UE is supplied with services within coverage of an E-UTRAN or when UE deviates from coverage of an E-UTRAN.

Figure 10:
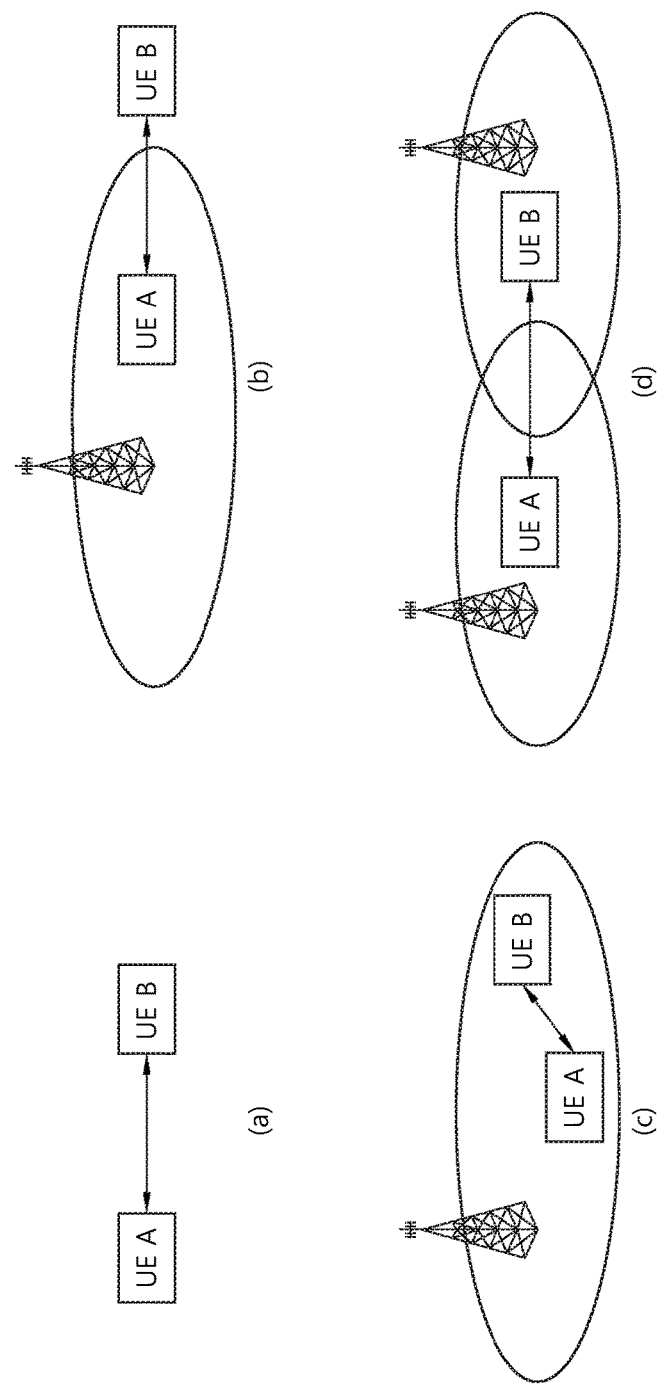
FIG. 10 shows the deployment examples of types of UE performing ProSe direct communication and cell coverage.

FIG. 10 shows the deployment examples of types of UE performing ProSe direct communication and cell coverage.

Referring to FIG. 10(a), types of UE A and B may be placed outside cell coverage. Referring to FIG. 10(b), UE A may be placed within cell coverage, and UE B may be placed outside cell coverage. Referring to FIG. 10(c), types of UE A and B may be placed within single cell coverage. Referring to FIG. 10(d), UE A may be placed within coverage of a first cell, and UE B may be placed within coverage of a second cell.

ProSe direct communication may be performed between types of UE placed at various positions as in FIG. 10.

Meanwhile, the following IDs may be used in ProSe direct communication.

A source layer-2 ID: this ID identifies the sender of a packet in the PC 5 interface.

A destination layer-2 ID: this ID identifies the target of a packet in the PC 5 interface.

An SA L1 ID: this ID is the ID of scheduling assignment (SA) in the PC 5 interface.

Figure 11:
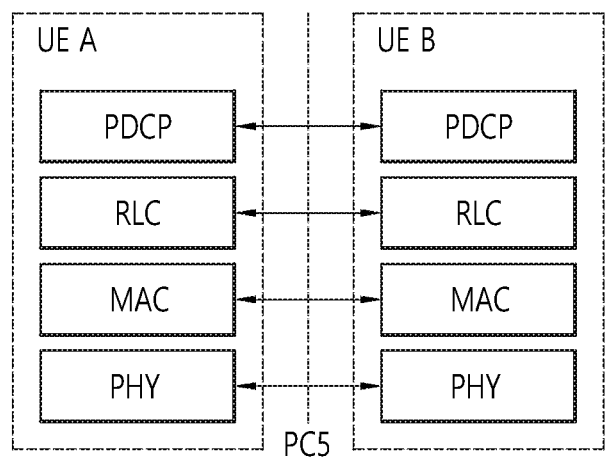
FIG. 11 shows a user plane protocol stack for ProSe direct communication.

FIG. 11 shows a user plane protocol stack for ProSe direct communication.

Referring to FIG. 11, the PC 5 interface includes a PDCH, RLC, MAC, and PHY layers.

In ProSe direct communication, HARQ feedback may not be present. An MAC header may include a source layer-2 ID and a destination layer-2 ID.

<Radio Resource Assignment for ProSe Direct Communication>

ProSe-enabled UE may use the following two types of mode for resource assignment for ProSe direct communication.

1. Mode 1

Mode 1 is mode in which resources for ProSe direct communication are scheduled by an eNB. UE needs to be in the RRC CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2. Mode 2

Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC CONNECTED state with an eNB or is placed in a specific cell in the RRC_IDLE state, the UE is considered to be placed within coverage of the eNB.

If UE is placed outside coverage, only mode 2 may be applied. If the UE is placed within the coverage, the UE may use mode 1 or mode 2 depending on the configuration of an eNB.

If another exception condition is not present, only when an eNB performs a configuration, UE may change mode from mode 1 to mode 2 or from mode 2 to mode 1.

<ProSe Direct Discovery>

ProSe direct discovery refers to a procedure that is used for ProSe-enabled UE to discover another ProSe-enabled UE in proximity and is also called D2D direct discovery. In this case, E-UTRA radio signals through the PC 5 interface may be used. Information used in ProSe direct discovery is hereinafter called discovery information.

Figure 12:
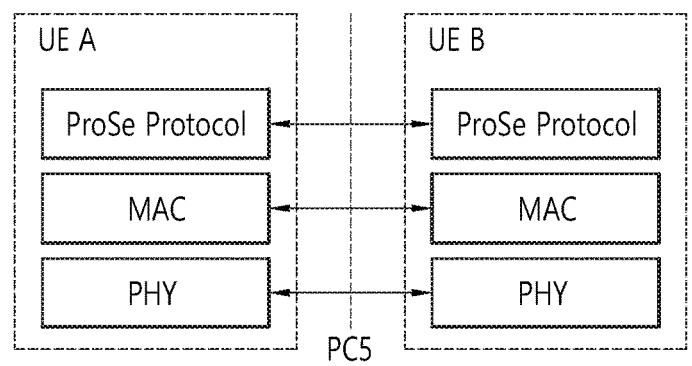
FIG. 12 shows the PC 5 interface for D2D direct discovery.

FIG. 12 shows the PC 5 interface for D2D direct discovery.

Referring to FIG. 12, the PC 5 interface includes an MAC layer, a PHY layer, and a ProSe Protocol layer, that is, a higher layer. The higher layer (the ProSe Protocol) handles the permission of the announcement and monitoring of discovery information. The contents of the discovery information are transparent to an access stratum (AS). The ProSe Protocol transfers only valid discovery information to the AS for announcement.

The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1. Type 1

The type 1 is a method for assigning a resource for announcing discovery information in a UE-not-specific manner. An eNB provides a resource pool configuration for discovery information announcement to types of UE. The configuration may be signaled through the SIB.

UE autonomously selects a resource from an indicated resource pool and announces discovery information using the selected resource. The UE may announce the discovery information through a randomly selected resource during each discovery period.

2. Type 2

The type 2 is a method for assigning a resource for announcing discovery information in a UE-specific manner. UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

An eNB 1) may announce a type 1 resource pool for discovery signal announcement to UE in the RRC_IDLE state through the SIB. Types of UE whose ProSe direct discovery has been permitted use the type 1 resource pool for discovery information announcement in the RRC_IDLE state. Alternatively, the eNB 2) announces that the eNB supports ProSe direct discovery through the SIB, but may not provide a resource for discovery information announcement. In this case, UE needs to enter the RRC_CONNECTED state for discovery information announcement.

An eNB may configure that UE has to use a type 1 resource pool for discovery information announcement or has to use a type 2 resource through an RRC signal in relation to UE in the RRC_CONNECTED state.

Figure 13:
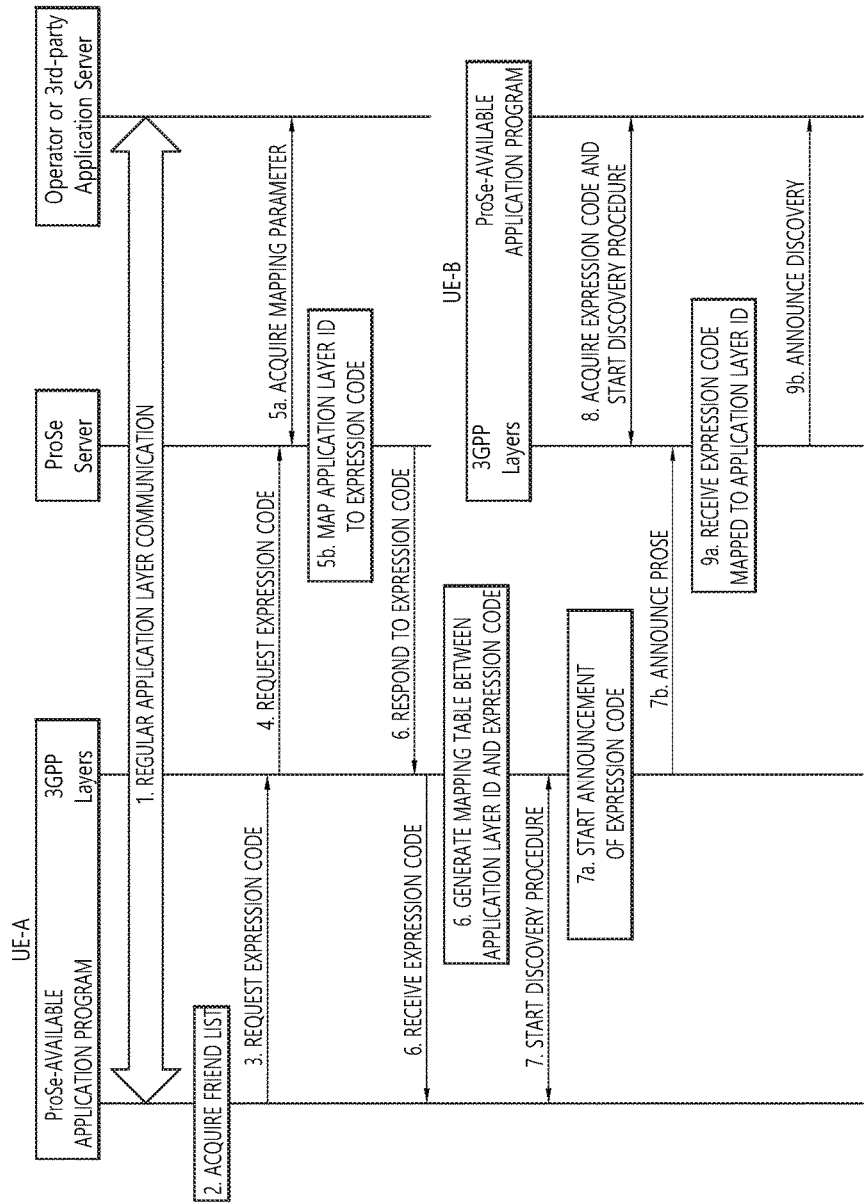
FIG. 13 is an embodiment of a ProSe discovery process.

FIG. 13 is an embodiment of a ProSe discovery process.

Referring to FIG. 13, it is assumed that UE A and UE B have ProSe-enabled application programs managed therein and have been configured to have a 'friend' relation between them in the application programs, that is, a relationship in which D2D communication may be permitted between them. Hereinafter, the UE B may be represented as a 'friend' of the UE A. The application program may be, for example, a social networking program. '3GPP Layers' correspond to the functions of an application program for using ProSe discovery service, which have been defined by 3GPP.

Direct discovery between the types of UE A and B may experience the following process.

1. First, the UE A performs regular application layer communication with the APP server. The communication is based on an Application Program Interface (API).

2. The ProSe-enabled application program of the UE A receives a list of application layer IDs having a 'friend' relation. In general, the application layer ID may have a network access ID form. For example, the application layer ID of the UE A may have a form, such as "adam@example.com."

3. The UE A requests private expressions code for the user of the UE A and private representation code for a friend of the user.

4. The 3GPP layers send a representation code request to the ProSe server.

5. The ProSe server maps the application layer IDs, provided by an operator or a third party APP server, to the private representation code. For example, an application layer ID, such as adam@example.com, may be mapped to private representation code, such as "GTER543$#2FSJ67DFSF." Such mapping may be performed based on parameters (e.g., a mapping algorithm, a key value and so on) received from the APP server of a network.

6. The ProSe server sends the types of derived representation code to the 3GPP layers. The 3GPP layers announce the successful reception of the types of representation code for the requested application layer ID to the ProSe-enabled application program. Furthermore, the 3GPP layers generate a mapping table between the application layer ID and the types of representation code.

7. The ProSe-enabled application program requests the 3GPP layers to start a discovery procedure. That is, the ProSe-enabled application program requests the 3GPP layers to start discovery when one of provided 'friends' is placed in proximity to the UE A and direct communication is possible. The 3GPP layers announces the private representation code (i.e., in the above example, "GTER543$#2FSJ67DFSF", that is, the private representation code of adam@example.com) of the UE A. This is hereinafter called 'announcement'. Mapping between the application layer ID of the corresponding application program and the private representation code may be known to only 'friends' which have previously received such a mapping relation, and the 'friends' may perform such mapping.

8. It is assumed that the UE B operates the same ProSe-enabled application program as the UE A and has executed the aforementioned 3 to 6 steps. The 3GPP layers placed in the UE B may execute ProSe discovery.

9. When the UE B receives the aforementioned 'announce' from the UE A, the UE B determines whether the private representation code included in the 'announce' is known to the UE B and whether the private representation code is mapped to the application layer ID. As described the 8 step, since the UE B has also executed the 3 to 6 steps, it is aware of the private representation code, mapping between the private representation code and the application layer ID, and corresponding application program of the UE A. Accordingly, the UE B may discover the UE A from the 'announce' of the UE A. The 3GPP layers announce that adam@example.com has been discovered to the ProSe-enabled application program within the UE B.

In FIG. 13, the discovery procedure has been described by taking into consideration all of the types of UE A and B, the ProSe server, the APP server and so on. From the viewpoint of the operation between the types of UE A and B, the UE A sends (this process may be called announcement) a signal called announcement, and the UE B receives the announce and discovers the UE A. That is, from the aspect that an operation that belongs to operations performed by types of UE and that is directly related to another UE is only step, the discovery process of FIG. 13 may also be called a single step discovery procedure.

Figure 14:
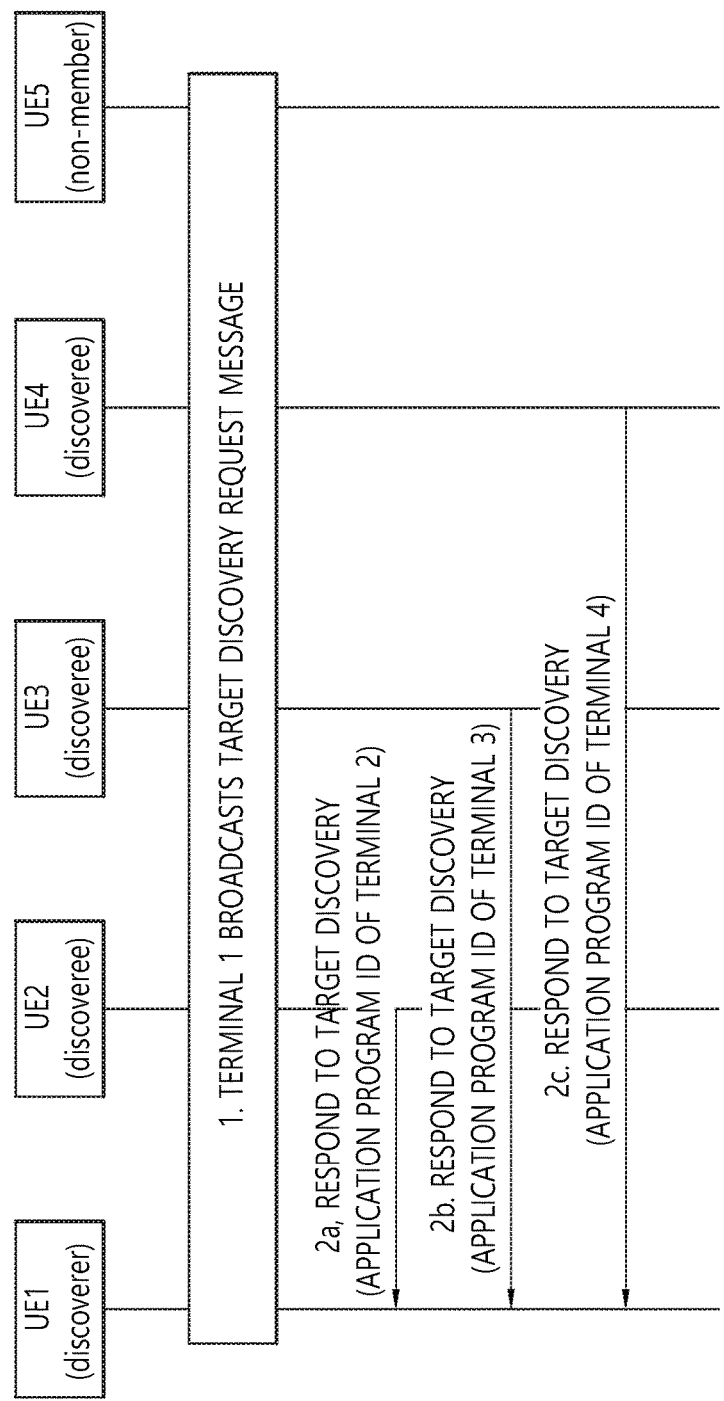
FIG. 14 is another embodiment of a ProSe discovery process.

FIG. 14 is another embodiment of a ProSe discovery process.

In FIG. 14, types of UE 1 to 4 are assumed to types of UE included in specific group communication system enablers (GCSE) group. It is assumed that the UE 1 is a discoverer and the types of UE 2, 3, and 4 are discoveree. UE 5 is UE not related to the discovery process.

The UE 1 and the UE 2-4 may perform a next operation in the discovery process.

First, the UE 1 broadcasts a target discovery request message (may be hereinafter abbreviated as a discovery request message or M1) in order to discover whether specific UE included in the GCSE group is in proximity. The target discovery request message may include the unique application program group ID or layer-2 group ID of the specific GCSE group. Furthermore, the target discovery request message may include the unique ID, that is, application program private ID of the UE 1. The target discovery request message may be received by the types of UE 2, 3, 4, and 5.

The UE 5 sends no response message. In contrast, the types of UE 2, 3, and 4 included in the GCSE group send a target discovery response message (may be hereinafter abbreviated as a discovery response message or M2) as a response to the target discovery request message. The target discovery response message may include the unique application program private ID of UE sending the message.

An operation between types of UE in the ProSe discovery process described with reference to FIG. 14 is described below. The discoverer (the UE 1) sends a target discovery request message and receives a target discovery response message, that is, a response to the target discovery request message. Furthermore, when the discoveree (e.g., the UE 2) receives the target discovery request message, it sends a target discovery response message, that is, a response to the target discovery request message. Accordingly, each of the types of UE performs the operation of the 2 step. In this aspect, the ProSe discovery process of FIG. 14 may be called a 2-step discovery procedure.

In addition to the discovery procedure described in FIG. 14, if the UE 1 (the discoverer) sends a discovery conform message (may be hereinafter abbreviated as an M3), that is, a response to the target discovery response message, this may be called a 3-step discovery procedure.

Hereinafter, the present invention will be described.

A network may provide the information related to a D2D operation according to a cell. For example, the information may indicate the resources that a UE may use for receiving D2D signals. The information may be broadcasted.

The resource that a UE uses for transmitting and receiving data in the RRC connected state for the conventional cellular communication may be determined by a BS and notified to the UE through the UE dedicated signaling. That is, the UE in the RRC connected state receives the configuration of resource that is to be used in the RRC connected state from the BS through the UE dedicated configuration. When the UE is configured to perform the D2D transmission and reception only in the RRC connected state, the UE should establish the RRC connection when trying to perform the D2D transmission and reception. Then, considering the mobility in the RRC connected state, the UE has the burden to perform all procedures that should be performed in the RRC connected state, such as the measurement and the measurement report to a BS depending on the configuration, the scheduling monitoring of BS, and so on. It is required for a UE in the RRC idle state efficiently perform the D2D operation by broadcasting the D2D resource information within the coverage of cell, and also required to clearly regulate the D2D operation of UE according to the resource broadcasted when the RRC idle state of UE is switched to the RRC connected state.

Hereinafter, mode 1 is to schedule the resource for the D2D signal transmission performed by a UE, and mode 2 is to select a specific resource for the D2D signal transmission within the resource pool performed by a UE. That is, mode 1 may not allow the degree of freedom of UE or allow at a low level since the D2D signal transmission of UE is controlled by a network, and mode 2 may allow the degree of freedom of UE since the UE receives the configuration or selects a specific resource by itself within a predetermined resource pool and performs the D2D signal transmission.

The transmission of D2D signal by mode 1 may be simply referred to as mode 1 D2D transmission, and the reception of the D2D signal may be shortly referred to as mode 1 D2D reception. The transmission of D2D signal by mode 2 may be simply referred to as mode 2 D2D transmission, and the reception of the D2D signal may be shortly referred to as mode 2 D2D reception.

The UE in the RRC idle state may receive the broadcasted resource pool information that may be applied to mode 2. The resource pool information may represent the resources that may receive the D2D signal transmitted by mode 2. In this sense, the resource pool information may also be referred to as the reception resource pool information.

In order for the UE that is going to perform the D2D reception to efficiently perform the D2D reception, it is preferable that a BS broadcasts the resource that is used for the D2D reception. That is, in the case that the corresponding cell is the cell that supports the D2D operation of UE, it is preferable that the cell should provide the reception resource that is used for the D2D reception of UE at the least.

When the UE receives the D2D reception resource in the RRC idle state from the cell, the UE determines that the UE may perform the D2D reception in the RRC idle state using the resource. That is, in this case, the UE is not required to perform the RRC connection procedure in order to enter the RRC connected state only for the D2D reception.

The UE that is performing the D2D reception in the RRC idle state may perform the RRC connection procedure in order to receive the configuration required for the D2D transmission resource and the D2D transmission or in order to perform the cellular communication. In this case, the UE determines the D2D reception resource received through the broadcast to be still valid. Accordingly, the UE may continuously perform the D2D reception using the valid D2D reception resource, and accordingly, there is no interruption of D2D reception service according to the RRC connection attempt.

The UE determines the D2D reception resource that is received through broadcast to be still valid even after entering into the RRC connected state by successfully performing the RRC connection procedure. Accordingly, the UE may continuously perform the D2D reception using the valid D2D reception resource, and accordingly, there is no interruption of D2D reception service according to entering the RRC connected state.

Until the UE in the RRC connected state receives the D2D reception resource and/or the D2D reception configuration from the BS through the UE dedicated signaling, the UE may determine the D2D reception resource received through broadcast to be still valid.

When the UE is performing the D2D reception using the D2D reception resource recognized by the broadcasted information, the UE should maintain the latest system information that includes the information notifying the D2D reception resource in the RRC connected state. That is, the UE monitors whether the system information including the information notifying the D2D reception resource is changed. When the UE is noticed the fact that the system information including the information notifying the D2D reception resource is changed, the UE receives the updated system information and performs the D2D operation according to the updated system information.

When the UE receives the broadcasted resource pool information that may be applied to mode 2, the UE may apply the resource pool information to the RRC connected state. When the UE in the RRC idle sate receives the broadcasted resource pool information that may be applied to mode 1, the UE may also apply the resource pool information to the RRC connected state. In this case, the resource pool information may represent the resources that may receive the D2D signal, which is transmitted by another UE in mode 1. In this sense, the resource pool information may be referred to as the reception resource pool information.

In the description above, the reception resource pool information is described by distinguishing it as modes 1 and 2, but not limited thereto. That is, the reception resource pool information may indicate the resource that may be used for the D2D signal reception regardless of modes 1 and 2.

The UE in the RRC idle state may receive the broadcasted resource pool information that may be applied to mode 2. The resource pool information may represent the resources that another UE may transmit the D2D signal by mode 2. In this sense, the resource pool information may be referred to as the transmission resource pool information.

In order for the UE that is going to perform the D2D transmission to perform the D2D transmission more efficiently, the BS may broadcast the resource that is used for the D2D transmission.

Meanwhile, when the UE that uses the network resource performs the D2D transmission, it may interfere in the network. In addition, for the purpose of figuring out the position of the UE, etc., the policy may be required that the network should perform the D2D transmission only after the UE enters the RRC connected state and receives the D2D transmission resource and configuration from the BS. Accordingly, the D2D transmission resource pool information may not be broadcasted by the cell that supports the D2D operation.

When the UE in the RRC idle state receives the information/configuration that represents the D2D transmission resource from the cell, the UE determines that the UE may perform the D2D transmission in the RRC idle state using the D2D transmission resource. That is, in this case, the UE is not required to perform the RRC connection procedure for entering the RRC connected state only for the D2D transmission.

The UE that is performing the D2D transmission in the RRC idle state may start the RRC connection procedure. In the case of the D2D transmission that is different from the D2D reception, it may be preferable that the UE stops the D2D transmission in order to minimize the influence on the RRC connection procedure when the UE tries to perform the RRC connection. In this case, the UE restarts the D2D transmission only in the case that the network configures the D2D transmission resource to the UE after the UE enters the RRC connected state.

When the UE is performing the D2D transmission using the D2D transmission resource indicated by the broadcasted information, the UE should maintain the latest system information that includes the information notifying the D2D transmission resource in the RRC connected state. That is, the UE monitors whether there is any changes in the system information including the information notifying the D2D transmission resource. When the UE is noticed the fact that the system information including the information notifying the D2D transmission resource is changed, the UE receives the updated system information and performs the D2D operation according to the updated system information.

Figure 15:
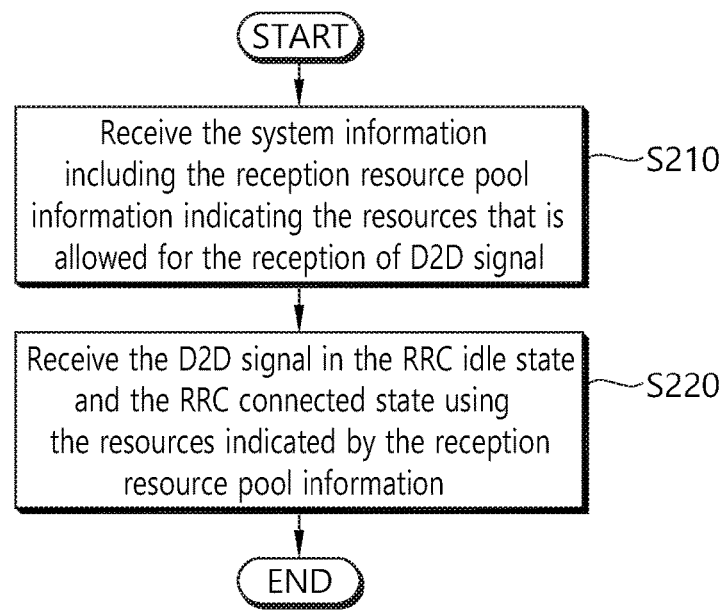
FIG. 15 illustrates a D2D operation method performed by a UE according to an embodiment of the present invention.

FIG. 15 illustrates a D2D operation method performed by a UE according to an embodiment of the present invention.

Referring to FIG. 15, a UE receives the system information that includes the reception resource pool information indicating the resources that is allowed for the reception of D2D signal (step, S210). The system information may be broadcasted. For example, the system may be broadcasted in the cell in which the UE is camped on or tries to camp on.

The D2D signal may be the signal for the D2D communication or the D2D discovery. The signal for the D2D discovery may be, for example, the discovery announcement.

The UE receives the D2D signal in the RRC idle state and the RRC connected state using the resources indicated by the reception resource pool information (step, S220).

The UE may receive the system information that includes the reception resource pool information in the RRC idle state. Even in the case that the UE is switched from the RRC idle state to the RRC connected state, the UE may receive the D2D signal using the resources indicated by the reception resource pool information.

The resources indicated by the reception resource pool information may be used when the UE receives the D2D signal that another UE transmits by mode 1 and/or mode 2.

Hereinafter, each of the steps in FIG. 15 will be described in detail.

The table below represents an example of the system information that includes the reception resource pool information indicating that the reception of D2D signal is allowed. The UE that receives the system information may regard that the network (e.g., the E-UTRAN) supports the D2D operation. The system information may configure the resources related to the D2D communication.

allowed to receive the D2D communication, that is, the resource pool, in the RRC idle state and the RRC connected state. The 'commRxPool' may an example of the reception resource pool information indicating the resource that is allowed for the reception of D2D signal, described in FIG. 15. The 'commSyncConfig' indicates the configuration that the UE is allowed to transmit or receive the synchronization information. The 'commTxPoolNormalCommon' indicates the resources (resource pool) that the UE is allowed to transmit the D2D communication during the RRC idle state, or indicates the resources that are allowed when the UE performs the D2D transmission through the frequency that is not the primary frequency in the RRC connected state.

That 'commTxPoolExceptional' indicates the resource that is allowed for the UE to transmit the D2D communication in an exceptional condition.

When the system information is broadcasted, and includes the 'commTxPoolExceptional', but not includes the 'commTxPoolNormalCommon', the UE may transmit the D2D signal (control information or data) for the D2D communication by selecting a specific resource within the resource pool that is indicated by the 'commTxPoolExceptional'.

Table 3 below represents another example of the system information that includes the reception resource pool infor-

TABLE 2

```
-- ASN1START
SystemInformationBlockType18-r12 ::= SEQUENCE {
        commConfig-r12                      SEQUENCE {
            commRxPool-r12              SL-CommRxPoolList-r12,
            commTxPoolNormalCommon-r12  SL-CommTxPoolList-r12
        OPTIONAL, -- Need OR
            commTxPoolExceptional-r12   SL-CommTxPoolList-r12
            OPTIONAL,    -- Need OR
            commSyncConfig-r12          SL-SyncConfigList-r12
            OPTIONAL    -- Need OR
        }
                                            OPTIONAL,   -- Need
OR
        lateNonCriticalExtension            OCTET STRING
                    OPTIONAL,
        ...
}
--ASN1STOP
```

Referring to Table 2, in the system information, the 'commRxPool' indicates the resources that the UE is mation indicating that the reception of D2D signal is allowed.

TABLE 3

```
-- ASN1START
SystemInformationBlockType19-r12 ::= SEQUENCE {
        discConfig-r12                          SEQUENCE {
            discRxPool-r12                      SL-DiscRxPoolList-r12,
            discTxPoolCommon-r12                SL-DiscTxPoolList-r12
                OPTIONAL,  -- Need OR
            discTxPowerInfo-r12                 SL-DiscTxPowerInfoList-r12
            OPTIONAL, -- Cond Tx
            discSyncConfig-r12                      SL-SyncConfigList-r12
                OPTIONAL   -- Need OR
        }
                                                OPTIONAL,       -- Need
OR
        discInterFreqList-r12                   SL-CarrierFreqInfoList-r12
        OPTIONAL, -- Need OR
        lateNonCriticalExtension                OCTET STRING
            OPTIONAL,
        ...
}
SL-CarrierFreqInfoList-r12 ::=      SEQUENCE (SIZE (1..maxFreq)) OF SL-
CarrierFreqInfo-r12
```

TABLE 3-continued

```
SL-CarrierFreqInfo-r12::=        SEQUENCE {
    carrierFreq-r12                      ARFCN-ValueEUTRA-r9,
    plmn-IdentityList-r12                PLMN-IdentityList4-r12
        OPTIONAL   -- Need OP
}
PLMN-IdentityList4-r12 ::= SEQUENCE (SIZE (1..maxPLMN-r11)) OF    PLMN-
IdentityInfo2-r12
PLMN-IdentityInfo2-r12 ::=       CHOICE {
    plmn-Index-r9                        INTEGER (1..maxPLMN-r11),
    plmnIdentity-r12                     PLMN-Identity
}
-- ASN1STOP
```

In Table 3 above, the 'discInterFreqList' indicates the neighbor frequencies in which the discovery announcement is supported. The 'discRxPool' indicates the resources in which the reception of the discovery signal (e.g., the discovery announcement) is allowed in the RRC idle state and the RRC connected state. The 'discRxPool' may an example of the reception resource pool information indicating that the reception of D2D signal is allowed, described in FIG. 15. The 'discSyncConfig' indicates the configuration that the UE is allowed to transmit or receive the synchronization information. The 'discTxPoolCommon' indicates the resources (resource pool) that are allowed for the UE to transmit the discovery signal (e.g., the discovery announcement) during the RRC idle state. The 'plmn-IdentityList' is the lists of the PLMN IDs. The 'plmn-Index' is the index that corresponds to the entry in the 'plmn-IdentityList' field of SIB 1(systeminformationblock type 1).

Figure 16:
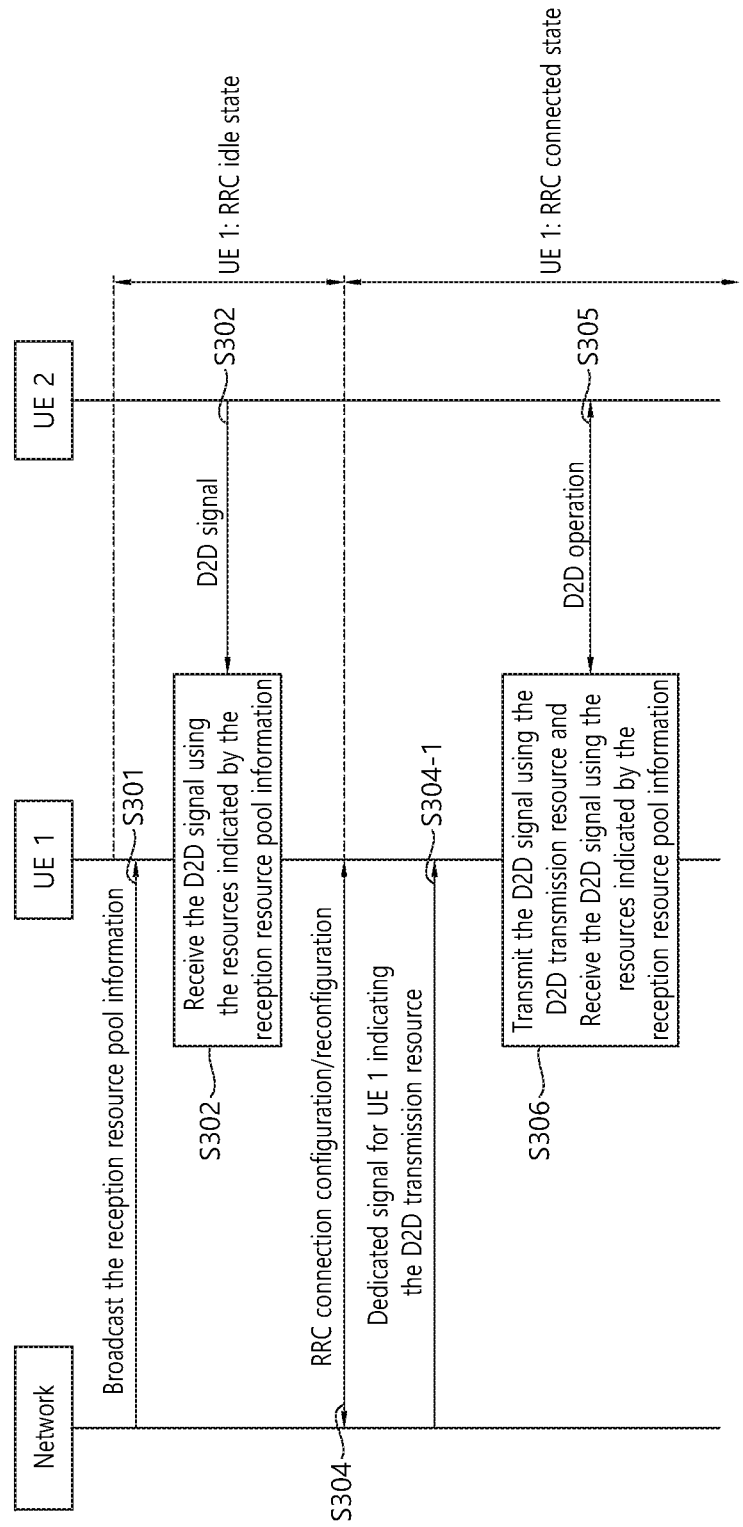
FIG. 16 exemplifies a D2D operation method of a UE.

FIG. 16 exemplifies a D2D operation method of a UE.

Referring to FIG. 16, a network broadcasts the reception resource pool information (step, S301). As described above by referring to FIG. 15, the reception resource pool information may be broadcasted with being included in the system information.

When UE 1 is positioned within the network coverage, UE 1 may receive the reception resource pool information. UE 1 may receive the reception resource pool information in the RRC idle state.

UE 2 neighboring to UE 1 may transmit the D2D signal to UE 1 (step, S302). UE 1 receives the D2D signal transmitted by UE 2 using the resources indicated by the reception resource pool information (step, S303).

UE 1 may perform the RRC connection configuration/reconfiguration with the network (step, S304). The procedure is described above by referring to FIGS. 5 and 6.

When the RRC connection configuration/reconfiguration is completed with the network, UE 1 is in the RRC connected state. UE 1 may receive the dedicated signal for UE 1, which indicates the D2D transmission resource in the RRC connected state (step, S304-1). The dedicated signal may include the information indicating the D2D transmission resource only, not include the information indicating the D2D reception resource.

UE 1 may transmit the D2D signal to UE 2 using the D2D transmission resource that is configured through the dedicated signal, and receive the D2D signal from UE 2 using the resources indicated by the reception resource pool information received in the RRC idle state (step, S306).

Using such a method, the interruption does not occur during the reception of the D2D signal by UE 1. Therefore, the reliability of D2D operation increases.

Meanwhile, with respect to the UE in the RRC connected state, the network may provide the D2D configuration for the D2D operation in mode 1 or mode 2. When the network does not include the resource pool information in the D2D configuration, the UE may apply the resource pool information that is broadcasted for the D2D operation in the RRC connected state.

After the UE is configured for the D2D that enables the operation of mode 1 or mode 2, the UE may experience the radio link failure (RLF), the network coverage breakaway, or the like. In this case, the UE may preserve the D2D configuration that is previously configured and the RRC connected mode.

When the time for preserving the D2D configuration and the resource pool information is referred to as the preserved time, the UE does not regard the D2D configuration and the resource pool information as being applicable after the preserved time is lapsed.

Otherwise, after the preserved time is lapsed, the UE may remove the resource pool information that was regarded as being applicable.

Or, after the preserved time is lapsed, the UE may perform the D2D transmission in mode 1 using the resource pool that is preconfigured. That is, after the preserved time is lapsed, the UE may switch the resource pool to the resource pool that is preconfigured.

The maximum value of the preserved time may be signaled by the network or predetermined. The preserved time may be started when the connection problem such as the RLF or a case of leaving the network coverage is detected.

<The D2D Communication in the RRC Idle State>

With respect to the D2D transmission within a cell in the RRC idle state, a network may control whether the D2D transmission is allowed. The network may allow the D2D transmission by the UE in the RRC idle state within a specific cell, that is, the D2D transmission in mode 2. In this case, the network may notify whether to support the D2D transmission in mode 2 to the UE, for example, through the broadcasted system information in the specific cell. When the UE fails to receive the system information, the UE may regard the D2D transmission in the RRC idle state is not allowed within the cell.

In relation to the D2D reception within the cell in the RRC idle state, as far as the D2D signal reception is allowed by the network, the network is not required to control the D2D signal reception. That is, whether to receive the D2D signal may be determined by the UE. Regardless of whether to support the D2D transmission in the RRC idle state within a specific cell, the UE may receive the D2D signal.

<The D2D Communication in the RRC Connected State>

When a UE is in the RRC connected state, the D2D transmission of the UE is allowed only in the case that the UE has the valid D2D configuration that may be applicable in the RRC connected state. For this reason, a network may provide the D2D configuration for the UE through the RRC connection reconfiguration message that includes the D2D configuration.

That is, the UE in the RRC connected state is allowed to perform the D2D transmission only in the case that the network provides the D2D configuration for the UE. The D2D configuration may be provided through the dedicated signal for the UE.

The reception of D2D signal in the RRC connected state may be determined by the UE since the network allows the D2D signal. That is, the reception of the D2D signal is allowed regardless of whether the UE is provided with the D2D configuration through the dedicated signal.

<Mode Configuration>

A network may configure for the UE which mode is available to operate or which mode should be appropriate to operate from mode 1 or mode 2, and it is referred to as the mode configuration. In this case, the signaling for the mode configuration may use the high layer signal such as the RRC or the low layer signal such as the physical layer signal. Since the mode configuration is not performed frequently nor sensitive to the latency, the RRC signal may be used.

Only mode 2 may be applied to the UE in the RRC idle state. On the other hand, both of mode 1 and mode 2 may be applied to the UE in the RRC connected state. That is, the selection/configuration between mode 1 and mode 2 is required only for the UE in the RRC connected state. Accordingly, the dedicated RRC signaling may be used for the mode configuration.

Meanwhile, in the mode configuration, the available option is to be selected one between mode 1 and mode 2, or to be selected among mode 1, mode 2 and mode 1 & 2. When mode 1 & 2 is configured, the network schedules the resource for the D2D transmission, and the UE may perform the D2D transmission using the scheduled resource. In addition, the UE may also perform the D2D transmission by selecting a specific resource within the resource pool.

The network may configure one of mode 1, mode 2 and mode 1 & 2 to the UE through the dedicated RRC signaling.

<Resource Pool Configuration and Signaling>

In considering the aspect of the D2D signal transmission of UE, when the UE configured in mode 1 performs the D2D transmission, the UE is scheduled with the resource for the D2D transmission from a network. Accordingly, the UE is not required to know the resource pool for the D2D transmission. When the UE configured in mode 2 performs the D2D transmission, the UE should know the resource pool for the D2D transmission.

In considering the aspect of the D2D signal reception of UE, in order for a UE to receive the D2D transmission in mode 1 by another UE, the UE should know the mode 1 reception resource pool. Herein, the mode 1 reception resource pool may be the union of resource pools that is used for the D2D transmission in mode 1 of a serving cell and a neighboring cell. In order for the UE to receive the D2D transmission in mode 2 by another UE, the UE should know the mode 2 reception resource pool. Herein, the mode 2 reception resource pool may be the union of resource pools that is used for the D2D transmission in mode 2 of a serving cell and a neighboring cell.

For the resource pool 1 of mode 1, the UE is not required to know the mode 1 transmission resource pool. This is because the mode 1 D2D transmission is scheduled by a network. However, in order for a specific UE to receive the mode 1 D2D transmission from other UE, the specific UE should know the mode 1 transmission resource pool of other UEs. In order for the specific UE to receive the mode 1 D2D transmission in the RRC idle state, it may be required for a cell to broadcast the information indicating the mode 1 reception resource pool. This information may be applicable for both of the RRC idle state and the RRC connected state.

When a specific cell wants to allow the mode 1 D2D reception for the UE in the cell, the information indicating the mode 1 reception resource pool may be broadcasted. The mode 1 reception resource pool information may be applicable for both of the RRC idle state and the RRC connected state.

In order that the mode 2 D2D transmission is allowed/enabled for the UE in the RRC idle state, it is required to notify the resource pool that is available to use for the mode 2 D2D transmission in the RRC idle state to the UE. For this, the cell may broadcast the resource pool information. That is, when a specific cell wants to allow the D2D transmission for the UE in the RRC idle state, the specific cell may broadcast the resource pool information that represents the resource pool that may be applied to the D2D transmission in the RRC idle state through the system information.

Similarly, in order that the mode 2 D2D reception is allowed/enabled for the UE in the RRC idle state, it is required to notify the resource pool that is available to use for the mode 2 D2D reception in the RRC idle state to the UE. For this, the cell may broadcast the reception resource pool information that represents the reception resource pool.

That is, when a specific cell wants to allow the D2D reception by the UE in the RRC idle state, the specific cell may broadcast the resource pool information that represents the resource pool that may be applied to the D2D reception in the RRC idle state through the system information.

The resource pool information that represents the resource pool that may be applied to the D2D transmission in the RRC idle state may also be applied for the mode 2 D2D transmission in the RRC connected state. When a network configures the mode 2 operation for a specific UE through a dedicated signal, it may be implemented to provide the resource pool that is the same as the broadcasted resource pool. Otherwise, it may be regarded that the broadcasted resource pool may be applicable for both of the D2D transmission and the D2D reception in the RRC connected state. As far as the UE is configured in mode 2, it may be regarded that the broadcasted resource pool may be valid in the RRC connected state. That is, so far as other resource is not indicated by the dedicated signaling, the broadcasted mode 2 D2D resource pool information may also be used for the mode 2 D2D communication.

It is not necessarily required to notify the resource pool information through the dedicated signal for the specific UE in the network coverage. In the case of notifying the resource pool information through dedicated signaling, the optimization may be available by decreasing the monitoring resource for the specific UE. However, such an optimization may require the complex network cooperation between cells.

Figure 17:
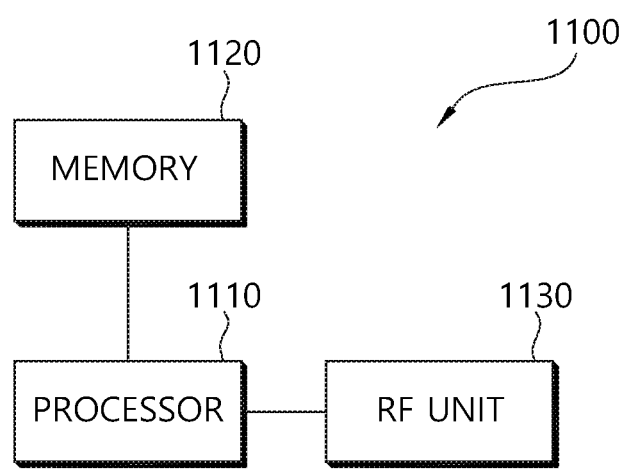
FIG. 17 is a block diagram illustrating a UE in which the embodiments of the present invention are implemented.

FIG. 17 is a block diagram illustrating a UE in which the embodiments of the present invention are implemented.

Referring to FIG. 17, a UE 1100 includes a processor 1110, a memory 1120 and a radio frequency (RF) unit 1130. The processor 1110 implements the proposed functions, processes and/or methods. For example, the processor 1110 may be configured to receive the system information including the reception resource pool information, and to receive the D2D signal using the resources indicated by the reception resource pool information. The reception resource pool information may indicate the resources in which the reception of D2D signal is allowed in both of the RRC idle state and the RRC connected state of the UE.

The RF unit 1130 is connected to the processor 1110 and sends and receives radio signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method for operating a device-to-device (D2D) in a wireless communication system, the method performed by a user equipment (UE) and comprising:
   receiving system information including reception resource pool information; and
   receiving a D2D signal using resources informed by the reception resource pool information,
   wherein the reception resource pool information informs resources in which reception of the D2D signal is allowed while in a radio resource control (RRC) idle state and while in an RRC connected state,
   wherein, when the UE receives the system information including the reception resource pool information in the RRC idle state, the UE receives the D2D signal using the resources informed by the reception resource pool information, even in a case that the UE is switched from the RRC idle state to the RRC connected state, and
   wherein, when the system information further includes exceptional resource information, the UE transmits another D2D signal using resources informed by the exceptional resource information if the UE detects a radio link failure at a cell providing the system information.

2. The method of claim 1, wherein the system information is broadcasted.

3. The method of claim 1, wherein the D2D signal is a signal for a D2D communication or a signal for a D2D discovery.

4. A user equipment (UE) for operating in a wireless communication system, the UE comprising:
   a transceiver configured to transmit or receive a radio signal; and
   a processor operatively connected to the transceiver,
   wherein the processor is configured to:
      receive system information including reception resource pool information; and
      receive a device-to-device (D2D) signal using resources informed by the reception resource pool information,
   wherein the reception resource pool information informs resources in which reception of the D2D signal is allowed while in a radio resource control (RRC) idle state and while in an RRC connected state, and
   wherein, when the UE receives the system information including the reception resource pool information in the RRC idle state, the UE receives the D2D signal using the resources informed by the reception resource pool information, even in a case that the UE is switched from the RRC idle state to the RRC connected state, and
   wherein, when the system information further includes exceptional resource information, the UE transmits another D2D signal using resources informed by the exceptional resource information if the UE detects a radio link failure at a cell providing the system information.

5. The UE of claim 4, wherein the system information is broadcasted.

6. The UE of claim 4, wherein the D2D signal is a signal for a D2D communication or a signal for a D2D discovery.

* * * * *